United States Patent [19]

Petersen

[11] Patent Number: 4,797,253

[45] Date of Patent: Jan. 10, 1989

[54] LAMINATED FABRIC COATED PLASTIC MATERIAL

[76] Inventor: Kurt Petersen, No. 18 Kongebakken, DK-5700 Svendborg, Denmark

[21] Appl. No.: 126,130

[22] PCT Filed: Mar. 26, 1987

[86] PCT No.: PCT/DK87/00026

§ 371 Date: Nov. 25, 1987

§ 102(e) Date: Nov. 25, 1987

[87] PCT Pub. No.: WO87/05953

PCT Pub. Date: Oct. 8, 1987

[51] Int. Cl.$^4$ .................. A41D 31/02; B32B 3/26; B32B 7/12; B32B 27/16; B32B 27/32

[52] U.S. Cl. .................. 428/196; 156/275.3; 156/275.7; 156/308.2; 156/308.4; 156/324.4; 428/247; 428/286; 428/317.1; 428/317.7; 2/143 A

[58] Field of Search ............ 428/196, 247, 286, 317.1, 428/317.7; 156/275, 3, 275.7, 308.2, 308.4, 324.4

[56] References Cited

U.S. PATENT DOCUMENTS

| | | |
|---|---|---|
| 3,577,305 | 5/1971 | Hines et al. .................. 428/72 |
| 4,225,373 | 9/1980 | Bieler et al. . |
| 4,318,763 | 3/1982 | Bieler et al. . |
| 4,436,570 | 3/1984 | Neuhaus et al. .................. 156/275.7 |
| 4,469,741 | 9/1984 | Akao .................. 428/317.1 |
| 4,565,733 | 1/1986 | Akao .................. 428/317.1 |
| 4,608,104 | 8/1986 | Holtrop .................. 428/317.1 |
| 4,609,420 | 9/1986 | Aydin et al. .................. 156/275.7 |
| 4,649,077 | 3/1987 | Lauehenauer .................. 428/317.1 |
| 4,695,501 | 9/1987 | Robinson .................. 428/317.1 |

FOREIGN PATENT DOCUMENTS

| | | |
|---|---|---|
| 22976 | 5/1975 | Denmark . |
| 0147358 | 7/1984 | Denmark . |
| 0032729 | 7/1981 | European Pat. Off. . |
| 1956168 | 1/1971 | Fed. Rep. of Germany . |
| 1769534 | 2/1971 | Fed. Rep. of Germany . |
| 2609352 | 9/1976 | Fed. Rep. of Germany . |
| 2309332 | 11/1976 | France . |
| 2115741 | 9/1983 | United Kingdom . |
| 2133344 | 7/1984 | United Kingdom . |

OTHER PUBLICATIONS

Werner Laeis: "Einführµng in die Werkstoffkunde der Kunststoffe", München, 1972, pp. 219–220.

Herman V. Boenig: "Structure and Properties of Polymers", p. 251.

Primary Examiner—James C. Cannon
Attorney, Agent, or Firm—Wegner & Bretschneider

[57] ABSTRACT

By using a hot melt adhesive sheet a fabric is adhered to at least one side of an air cell sheet of polyethylene after radiation with $\beta$-or $\gamma$-rays. The material combines great strength and flexibility with good thermal insulating ability and low weight together with great and permanent buoyancy in water.

4 Claims, 1 Drawing Sheet

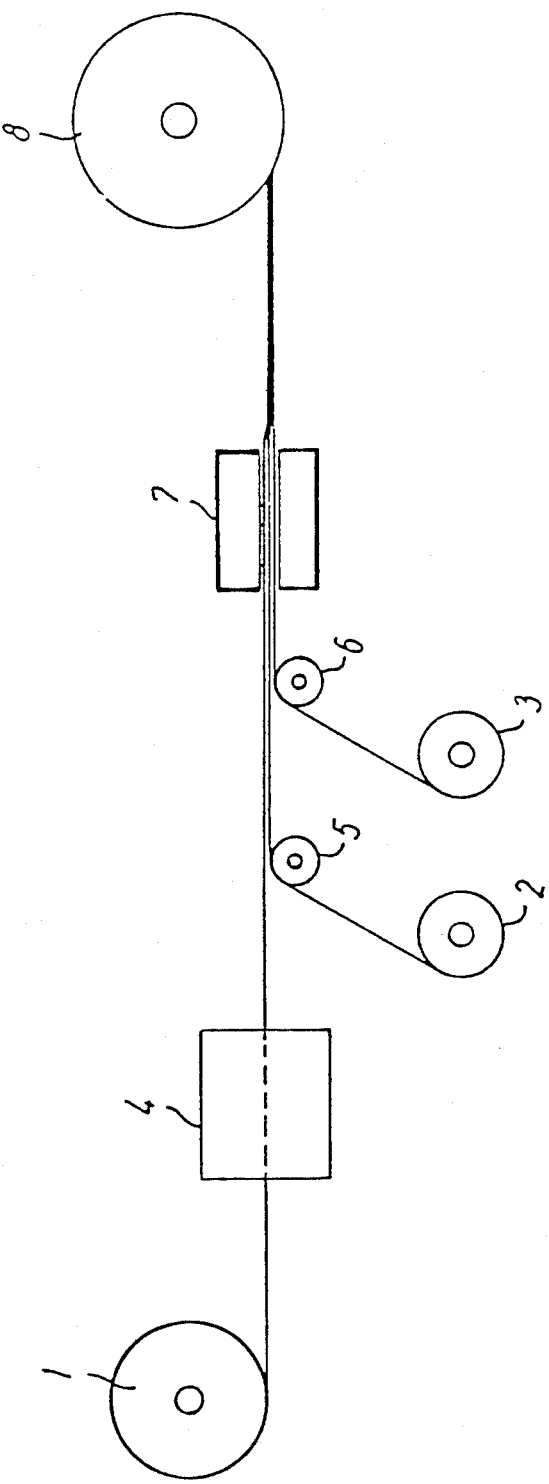

LAMINATED FABRIC COATED PLASTIC MATERIAL

This invention relates to a laminated fabric coated plastic material with well insulating properties and comprising plastic encapsulated air cells.

It is known to join or seal fabric and foamed neoprene rubber or other foamed plastic material to obtain a sheet-shaped material having a thickness in the range from some mm, said material being waterproof and having heat insulating, noise silencing and shock-absorbing properties.

A drawback of said materials based on foamed neoprene consists, however, in that their high price and great weight per unit af area set narrow limits to the field of application, for instance for garments, and their heat insulating ability is not so high as desirable.

U.S. Pat. No. 3,577,305 discloses a thermal and shock insulating material consisting of an air cell sheet formed from two very thin heat-sealed sheets of polyethylene or the like, one of which includes blisters, which by fusion with the second sheet are sealed, thereby forming air cells. Said air cell sheet is used together with a reflecting material, but this is only sealed to the air cell sheet at the edges thereof and is loosely resting on the central parts. Even though a reflecting material with a considerably mechanical strength was used for said material, it would not be able to substantially compensate for the deficient mechanical strength of the air cell sheet, and the material would not be appropriate e.g. as the sole material for sewing garments and the like. Moreover, a sheet of material cannot be cut out straightaway in a desired shape since, as mentioned, a sealing is required at the edges of the air cell sheet and the reflecting material.

In view of the above there is a demand for a material of the type concerned which has a particularly well heat-insulating ability, stands strong mechanical stress and is light and which is waterproof and extremely resistant to light and weather.

The material according to the invention possesses said properties and is characterized in that it is prepared by (a) radiating an air cell sheet of polyethylene, known per se and consisting of two welded layers, one of which is plane and the other encloses blisters which together with the plane layer form airfilled cells with $\beta$-and/or $\gamma$-rays, (b) coating one or both sides of the radiated air cell sheet with a web of hot melt adhesive film, (c) coating the surface of said adhesive film with a web of fabric material, and (d) heating the sheets for melting the adhesive film and compressing the heated sheets.

The obtained material is a hitherto unknown product possessing a combination of valuable properties, not only because the strong and permanent adhesion of the fabric and the air cell sheet increases considerably the resistance of this latter to mechanical stress, e.g. to tearing, but also because the radiation with $\beta$- and/or $\gamma$-rays changes the properties of the air cell sheet made of polyethylene so that the material becomes more resistant e.g. to light affection.

A material as that concerned cannot be prepared without the radiation stated in step a) since, on one hand, the air cell sheet could not be permanently joined with the hot melt adhesive sheet without previous radiation and, on the other hand, the air cell sheet would not be able to stand the pressure required to fuse the sheets at increased temperature, since the individual cells would be damaged by the pressure and the temperature required to activate the hot melt adhesive film.

It has proved that the radiation cannot be replaced by a so-called corona-processing that is the most common method of increasing the susceptibility of plastic materials inter alia to adhesives. Said processing does not offer the required increasing of the strength of the air cell sheet at high temperature and, moreover, the obtained improvement of the susceptibility to adhesives is not permanent.

The radiation in step (a) with $\beta$- and/or $\gamma$-rays entails, however, not alone an improved susceptibility to adhesives and an increased strength at a high temperature, but it may, if too excessive, cause a deterioration of the strength of the air cell sheet. Tests carried out by Teknologisk Institut, Tåastrup, have thus shown that radiation of the air cell sheet with $\beta$-rays in a dose of more than 25 Mrad caused a weakening of the compressive strength of the individual air cells at room temperature.

It is therefore preferred in step (a) to practise a radiation dose in the range from 5 to 25 Mrad.

The hot melt adhesive sheet used in the preparation of the laminated material according to the invention is of a type known per se. Such adhesive sheets substantially do not contain any solvent and they are non-adhesive at room temperature. Adhesive sheets of this type are designated as pertaining to the Hot Melt type. Said adhesive sheets are generally used in laminating and related processes in which web-shaped materials, as for instance fabric, are sealed, the adhesive sheet being inserted between said two materials and subsequently subjected to fusion, the materials to be sealed being concurrently or subsequently squeezed against each other at a suitable pressure, following which the adhesive sheet is again caused to solidify.

The chemical composition of the commercially accessible hot melt adhesive sheets is generally not revealed by the supplier, but a skilled person is in a position to ascertain by simple experiments whether a given adhesive sheet is fitted for use in the preparation of the material according to the invention. As examples of adhesive sheets that have proved appropriate may be mentioned those marketed under the name "Xiro" carrying the numbers 260, 268, 2051, V. 150/2 and 260/slit.

In respect of the flexibility of the material according to the invention it is expedient that the adhesive after the adhering step does not cover the total transitional surface between the air cell sheet and the fabric and, consequently, wherever such a flexibility is desired, an adhesive sheet having a netlike structure is preferably applied, or which in a manner known per se is provided with perforations, such as slits, causing it to form a netlike structure by fusion.

The fabric adhered to the air cell sheet may be of an arbitrary type, dependent on the intended use of the material according to the invention. The term fabric is used in this respect to also include glass fibre tissues.

The fabric may, as mentioned, be applied only to one side of the air cell sheet or to both sides thereof. In the first case, another web-shaped material such as paper, skin, leather, metal sheet, plastic sheet or asbestos may be glued on the opposite side of the radiated air cell sheet.

The radiation of the air cell sheet made of polyethylene does not need to be effected concurrently with the sealing thereof with the hot melt adhesive sheet and the fabric, the improved properties obtained with respect to susceptibility to the adhesive sheet and increased compression strength at high temperature being permanent. Frequently, the radiation will most conveniently be effected while the sheet is in its wound condition.

The radiation may, however, also be effected as a continuous process in the same sequence of operation as the joining together.

The joining step proper of the air cell sheet, the adhesive sheet and the fabric and the heating to melt and activate the adhesive sheet and the compression are effected in the ordinary way as regards adhesive sheets of the kind concerned, the same conditions being practised with respect to heat, pressure and time of affection, as prescribed in connection with the use of said adhesive sheet for other purposes.

The heating may for instance be effected by infrared radiation or by using gas burners, and the compression is effected by using squeeze rollers or simply by winding the sealed webs of material after activation of the adhesive sheet.

Generally, all calenders and laminating machines known for similar purposes come into consideration when joining the air cell sheet with the adhesive sheet and fabric.

The material according to the invention has a wide field of applications. As a possibility may be mentioned garments, for instance suits for mariners, sailors, cold store workers and for other persons exposed to extreme temperatures. Moreover, for tarpaulins and tents and for coverings of swimming pools, reservoirs and the like, and for wall lining.

With a view to such applications it is critical that the material according to the invention has an excellent thermal insulating ability and is waterproof. It is further important that it has a fairly low weight and, practically spoken, does not absorb water, even when submerged for a very long time.

It has thus been decided by experiments carried out by Skibsteknisk Laboratorium, Lyngby, (Report SL 1451.85080.30), that a material according to the invention which on either side is provided with a fabric made from synthetic fibres, said material having a thickness of about 4.8 mm, has a buoyancy in fresh water of 19.64 Newton per square meter corresponding to about 2 kg per square meter and that, when submerged in water for 24 hours, no deterioration of said buoyancy is provoked. This means that the material complies with the demands on materials for life jackets as regards buoyancy made according to the so-called SOLAS-Convention.

By way of comparison it can be stated that prior materials based on fabric coated neoprene do not, practically spoken, possess any buoyancy.

The heat insulating ability was tested by Teknologisk Institut, Tåastrup, for a corresponding material according to the invention, the one side of which was coated with glass fibre tissue and with paper on the other side. Said material had likewise a thickness of 4.8 mm and the weight amounted to approximately 0.5 kg per square meter.

In the experiment the hot side was exposed to a surface temperature of 16.3° C. and the cold side was exposed to a temperature of 3.5° C. This resulted in a thermal conductivity, k, of 0.045 W/m°C., and a thermal conduction resistance, m, of 0.107 $m^2$ °C./W. The method of measuring was practised according to DIN 56212.

Said values indicate that the heat insulating ability of the material having a thickness of only 4.8 mm according to the invention is quite as good as the heat insulating ability of fabric coated neoprene or of mineral wool of a substantially larger thickness.

The material according to the invention may be prepared at a cost of only about 30% of the cost of a neoprene material of the same thickness.

The preparation of the material according to the invention is very schematically illustrated on the drawing, in which a supply roll with air cell sheet, also designated blister sheet, of polyethylene is designated 1. A supply roll for adhesive sheet is designated 2, and a supply roll for fabric is designated 3.

From the supply roll 1 a web of the air cell sheet is unrolled which generally across a number of non-illustrated rollers serving to attain an appropriate resistance to the feeding of the sheet is passed through a radiation station 4, the intensity of which is adapted so that the sheet receives a radiation in the range from 5 to 25 Mrad when passed through the station at the feeding rate required in the succeeding sealing step.

From the supply roll a web of adhesive sheet is unwound which is passed across a roller 5 where it comes into contact with the web of polyolefine sheet and still in contact therewith is passed across a roller 6. A web of fabric from the supply roll 3 is then applied to the underside of the adhesive sheet, and the web consisting of air cell sheet, adhesive sheet and fabric is passed beneath a source 7 of radiant heat by which the adhesive sheet is heated to melt or to activate, e.g. to 140° C. The web consisting of air cell sheet and fabric with an intermediate layer of molten adhesive sheet is subsequently passed between one or more pair(s) of squeeze rollers (not shown) and then wound on the roller 8.

After cooling of the wound web a strong adhesion of the layers forming part of the web is attained so that the web cannot immediately be manually delaminated.

It is emphasized that the illustrated embodiment is only one of a number of possible embodiments. In particular, as regards work on a smaller scale, it is frequently be more advantageous to effect the radiation in another place than that of carrying out the adhesion process proper, a radiation station fulfilling many other purposes being then applicable.

The preparation of the material concerned is further illustrated by the following example.

EXAMPLE

An air cell sheet made of polyethylene (produced from polyethylene sheet having a thickness of 0.02 mm) was exposed to radiation of 17 Mrad and was joined by practising a similar principle as that illustrated in the drawing and by using an adhesive sheet marketed under the name "Xiro No, 268" (Supplier XIRO AG., CH-3185, Schmitten, Switzerland) with a layer of glass fibre tissue on the one side and a paper web on the other side. An extremely satisfactory sealing of the air cell sheet was obtained both as regards paper and glass fibre tissue. The obtained sheet coated on either side had a thickness of 4.8 mm and a weight of about 0.5 kg per square meter and it was this material for which, as mentioned above, a heat conductivity k of 0.45 W/m° C. and a heat conduction resistance, m, of 0.107 $m^2$ ° C./W were determined.

I claim:

1. A laminated fabric coated plastic material with insulating properties and comprising plastic encapsulated air cells, characterized in that it is produced by
   (a) radiating with beta- and/or gamma-rays an air cell sheet of polyethylene, known per se and consisting of two welded layers, one of which is plane and the other encloses blisters which together with the plane layer form airfilled cells,
   (b) coating one or both sides of the radiated air cell sheet with a web of hot melt adhesive film,
   (c) coating the surface of said adhesive film with a web of fabric material, and
   (d) heating the sheets for melting the adhesive film and compressing the heated sheets.

2. A laminated material as claimed in claim 1, characterized in that in steps (a) a radiation dose in the range from 5 to 25 Mrad is used in the production thereof.

3. A material as claimed in claim 1, characterized in that in step (b) an adhesive sheet having a netlike structure is used in the production thereof, or which in a manner known per se is provided with perforations causing it to form such a structure by fusion.

4. A material according to claim 1, characterized in that a fabric is applied to the side of the air cell sheet enclosing the blisters.

* * * * *

UNITED STATES PATENT AND TRADEMARK OFFICE
CERTIFICATE OF CORRECTION

PATENT NO. : 4,797,253

DATED : January 10, 1989

INVENTOR(S) : Kurt PETERSEN

It is certified that error appears in the above-identified patent and that said Letters Patent is hereby corrected as shown below:

On the cover page of the patent, please amend the following:

Item [22] Change "Mar. 26, 1987" to read --Mar. 26, 1986--.

Item [86] Change "PCT/DK87/00026" to read --PCT/DK86/00026--.

Under the heading entitled "FOREIGN PATENT DOCUMENTS", change "22976" to read --2229/76--.

Signed and Sealed this

Thirtieth Day of January, 1990

*Attest:*

JEFFREY M. SAMUELS

*Attesting Officer*     *Acting Commissioner of Patents and Trademarks*

UNITED STATES PATENT AND TRADEMARK OFFICE
CERTIFICATE OF CORRECTION

PATENT NO. : 4,797,253
DATED : January 10, 1989
INVENTOR(S) : Kurt PETERSEN

It is certified that error appears in the above-identified patent and that said Letters Patent is hereby corrected as shown below:

On the cover page of the patent, please amend the following:

Under the heading entitled "FOREIGN PATENT DOCUMENTS", first item, change "22976" to --2229/76--.

Signed and Sealed this

Twenty-sixth Day of November, 1991

Attest:

HARRY F. MANBECK. JR.

*Attesting Officer*  *Commissioner of Patents and Trademarks*